ns011668796B2

United States Patent
Scherz et al.

(10) Patent No.: US 11,668,796 B2
(45) Date of Patent: Jun. 6, 2023

(54) RADAR SYSTEM AND METHOD FOR DETERMINING AT LEAST ONE CALIBRATION PARAMETER FOR A RADAR SYSTEM

(71) Applicant: Infineon Technologies AG, Neubiberg (DE)

(72) Inventors: Philipp Scherz, Linz (AT); Markus Josef Lang, Pfarrkirchen (AT); Roland Vuketich, Arbing (AT)

(73) Assignee: Infineon Technologies AG, Neubiberg (DE)

( * ) Notice: Subject to any disclaimer, the term of this patent is extended or adjusted under 35 U.S.C. 154(b) by 207 days.

(21) Appl. No.: 16/950,287

(22) Filed: Nov. 17, 2020

(65) Prior Publication Data
US 2021/0156959 A1 May 27, 2021

(30) Foreign Application Priority Data
Nov. 22, 2019 (DE) .......................... 102019131585.9

(51) Int. Cl.
*G01S 7/40* (2006.01)
*G01S 7/35* (2006.01)
(52) U.S. Cl.
CPC ............ *G01S 7/4021* (2013.01); *G01S 7/352* (2013.01); *G01S 7/4008* (2013.01); *G01S 7/4017* (2013.01)

(58) Field of Classification Search
None
See application file for complete search history.

(56) References Cited

U.S. PATENT DOCUMENTS

2021/0072350 A1* 3/2021 Loesch .................. G01S 13/42

FOREIGN PATENT DOCUMENTS

DE 102018207718 A1 11/2019
DE 102018216538 A1 4/2020

* cited by examiner

*Primary Examiner* — Whitney Moore
(74) *Attorney, Agent, or Firm* — Harrity & Harrity, LLP

(57) ABSTRACT

A method is proposed for determining at least one calibration parameter for a radar system having a first radar transceiver and a second radar transceiver. The method includes performing a first calibration measurement and a second calibration measurement. The first calibration measurement and the second calibration measurement both include generating a first frequency-modulated oscillation signal and a second frequency-modulated oscillation signal, and combining the first oscillation signal received via the second terminal with the second oscillation signal, in order to generate a first difference signal for the first calibration measurement and a second difference signal for the second calibration measurement, both having a frequency difference between the first oscillation signal and the second oscillation signal. The method also includes determining the at least one calibration parameter based on the two difference signals generated for the first calibration measurement and for the second calibration measurement.

20 Claims, 10 Drawing Sheets

RADAR SYSTEM AND METHOD FOR DETERMINING AT LEAST ONE CALIBRATION PARAMETER FOR A RADAR SYSTEM

FIELD

The present disclosure relates to a radar system and a method for determining at least one calibration parameter for a radar system.

BACKGROUND

In a cascaded radar sensor, multiple radio-frequency (RF) transceiver chips (also known as Monolithic Microwave Integrated Circuits, MMIC) are used to achieve the highest possible number of transmit and receive channels.

The interconnected MMICs require a common local oscillator signal with a stable phase relationship in order to take advantage of the higher number of RF channels. However, due to temperature fluctuations the phase relationship between the MMICs is not stable, as even the smallest changes in the length of the distribution lines for the local oscillator signal affect the phase relationship. The resulting phase changes must be known in order to be able to compensate for them.

Another source of error in a radar sensor assembled from cascaded MMICs is that the MMICs do not scan their respective intermediate frequency (IF) signal at exactly the same time. This circumstance manifests as a linear phase error over the IF frequency and can be corrected if the sampling delay in the signal processing is known.

Calibration information is therefore required to correct errors in the signal processing in cascaded radar sensors.

SUMMARY

There is therefore a need to determine calibration parameters suitable for error correction for a radar system with multiple transceivers.

This need can be met by the subject matter of the patent claims.

An example embodiment relates to a method for determining at least one calibration parameter for a radar system having at least one first radar transceiver and a second radar transceiver. The method includes performing a first calibration measurement. The first calibration measurement includes generating a first frequency-modulated oscillation signal by means of the first radar transceiver based on frequency ramp parameters that characterize a frequency ramp. In addition, the first calibration measurement includes applying the first frequency-modulated oscillation signal to a first terminal of the first radar transceiver. The first terminal is connected to a second terminal of the second radar transceiver via a signal line. The first calibration measurement also includes generating a second frequency-modulated oscillation signal by means of the second radar transceiver based on the frequency ramp parameters. In addition, the first calibration measurement includes combining the first oscillation signal received via the second terminal with the second oscillation signal by means of the second radar transceiver in order to generate a first difference signal having a first frequency difference between the first oscillation signal and the second oscillation signal. The method also includes carrying out a second calibration measurement. The second calibration measurement includes generating the second frequency-modulated oscillation signal by means of the second radar transceiver based on the frequency ramp parameters. Furthermore, the second calibration measurement includes an application of the second frequency-modulated oscillation signal to the second terminal. In addition, the second calibration measurement includes generating the first frequency-modulated oscillation signal by means of the first radar transceiver based on the frequency ramp parameters. The second calibration measurement also includes combining the second oscillation signal received via the first terminal with the first oscillation signal by means of the first radar transceiver, in order to generate a second difference signal having a second frequency difference between the first oscillation signal and the second oscillation signal. The method also includes determining the at least one calibration parameter based on the first difference signal and the second difference signal.

A further example embodiment relates to a radar system including a first radar transceiver, a second radar transceiver and a processing circuit. The processing circuit is configured, for a first calibration measurement, to activate the first radar transceiver to generate a first frequency-modulated oscillation signal based on frequency ramp parameters that characterize a frequency ramp, and to apply it to a first terminal of the first radar transceiver. The first terminal is connected to a second terminal of the second radar transceiver via a signal line. Furthermore, the processing circuit is configured to activate the second radar transceiver to generate a second frequency-modulated oscillation signal based on the frequency ramp parameters for the first calibration measurement, and to combine the first oscillation signal received via the second terminal with the second oscillation signal in order to generate a first difference signal having a first frequency difference between the first oscillation signal and the second oscillation signal. The processing circuit is also configured to activate the second radar transceiver to generate the second oscillation signal based on the frequency ramp parameters for a second calibration measurement and to apply said oscillation signal to the second terminal. Furthermore, the processing circuit is configured to activate the first radar transceiver to generate the first oscillation signal based on the frequency ramp parameters for the second calibration measurement, and to combine the second oscillation signal received via the first terminal with the first oscillation signal in order to generate a second difference signal having a second frequency difference between the first oscillation signal and the second oscillation signal. The processing circuit is configured to determine at least one calibration parameter based on the first difference signal and the second difference signal.

BRIEF DESCRIPTION OF THE DRAWINGS

Some examples of devices and/or methods are described in more detail in the following with reference to the accompanying figures, purely as examples. In the drawings.

DETAILED DESCRIPTION

Various example embodiments will now be described in more detail with reference to the accompanying drawings, in which several examples are shown. In the figures, the thickness dimensions of lines, layers and/or regions may be shown exaggerated for the sake of clarity.

While other examples are suitable for various modifications and alternative forms, several specific examples of the same are therefore shown in the figures and are described in detail in the following. However, this detailed description does not limit further examples to the specific described forms. Further examples can cover all modifications, equivalents and alternatives, which are included in the scope of the disclosure. Identical or similar reference signs refer throughout the description of the figures to the same or similar elements which, when compared to each other may be implemented identically or in modified form although they provide the same or a similar function.

It is self-explanatory that when an element is designated as being "connected" or "coupled" to another element, the elements can be connected or coupled directly, or via one or more intermediate elements. If two elements A and B are combined using an "or", this should be understood to mean that all possible combinations are disclosed, i.e. only A, only B, as well as A and B, unless otherwise explicitly or implicitly defined. An alternative formulation for the same combinations is "at least one of A and B" or "A and/or B". The same applies, mutatis mutandis, to combinations of more than two elements.

The terminology that is used here to describe specific examples, is not intended to be limiting for other examples. If a singular form, e.g. "a, an" and "the" is used and the use of only a single element is neither explicitly nor implicitly defined as mandatory, then other examples may also use plural elements to implement the same function. If a function is described below as being implemented using a plurality of elements, further examples may implement the same function by using a single element or a single processing entity. It also goes without saying that the use of the terms "comprises", "comprising", "has" and/or "having" precisely defines the presence of the specified features, integers, steps, operations, processes, elements, components and/or a group of the same, but not the presence or the addition of one or more other features, integers, steps, operations, processes, elements, components and/or a group of the same.

Unless otherwise defined, all terms (including technical and scientific terms) are used here in their usual meaning in the field to which the examples belong.

Figure 1:
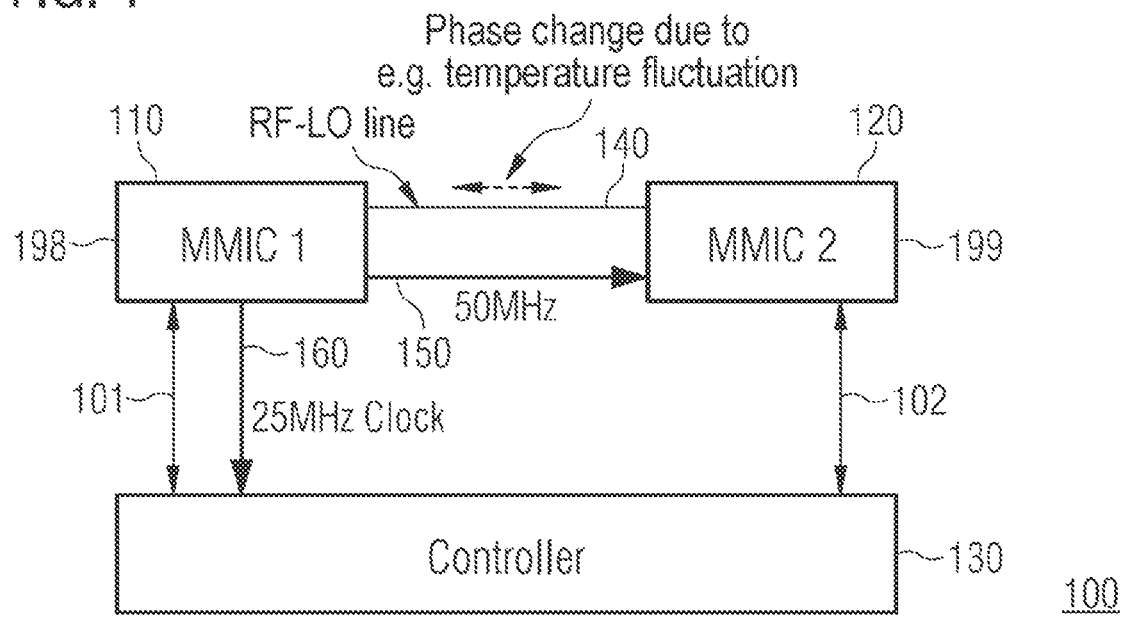
FIG. 1 shows an example embodiment of a radar system.

FIG. 1 shows an example embodiment of a radar system 100 with a first radar transceiver 110 and a second radar transceiver 120. For example, the 100 radar system can be a cascaded radar system that has additional radar transceivers to increase the number of transmit channels and/or receive channels. In example embodiments, the radar system is a frequency-modulated continuous-wave radar system, also referred to as an FMCW radar. A processing circuit 130 controls the first radar transceiver 110 and the second radar transceiver 120 (indicated by the double arrows 101 and 102). For example, the processing circuit 130 can be designed in the form of an application-specific integrated circuit (ASIC), a microcontroller, a field programmable gate array (FPGA), a processor or a digital signal processor hardware (DSP hardware).

Both the first radar transceiver 110 and the second radar transceiver 120 each have a plurality of transmit and receive channels for transmitting or receiving radio-frequency radar signals (e.g. in the 77 GHz range). The first radar transceiver 110 and the second radar transceiver 120 use a common oscillation signal in order to be able to use the transmit and receive channels of both radar transceivers 110 and 120 together (in parallel) for the radar measurement. The use of the common oscillation signal allows the radar transceivers 110 and 120 to synchronize their signal generation.

In the example embodiment shown in FIG. 1, the first radar transceiver 110 is formed on a first semiconductor chip (MMIC) 198 and the second radar transceiver 120 is formed on a second semiconductor chip (MMIC) 199, different from the first.

For the exchange of the shared oscillation signal used during a radar measurement, a signal line 140 is connected (coupled) to both the first radar transceiver 110 and the second radar transceiver 120. For example, the first radar transceiver 110 can be operated as the master of the radar system 100 and provide the shared oscillation signal used during the radar measurement. For example, the shared oscillation signal used during the radar measurement may be an oscillation signal generated by a frequency synthesizer (e.g. a local oscillator) of the first radar transceiver 110, or an oscillation signal generated by frequency division of the oscillation signal generated by the local oscillator. In some example embodiments, the oscillation signal generated in the first transceiver 110 and transmitted from the first transceiver 110 to the second transceiver 120 can have a lower frequency (for example, smaller by a factor of 4, 6 or 8) than the oscillation signal used for the radar measurement. In this case, specific frequency multipliers may be provided in each of the transceivers, which increase the frequency of the oscillation signal by a factor so that the frequency required for the radar measurement is provided. In summary, the shared oscillation signal used during the radar measurement can therefore be an oscillation signal derived from the local oscillator and can have either the frequency used for the radar measurement, or a frequency which is reduced by a fraction. In alternative example embodiments, the shared oscillation signal used during the radar measurement can also be generated by the second radar transceiver 120 or the processing circuit 130. In example embodiments, the shared oscillation signal used during the radar measurement is a frequency-modulated oscillation signal, which changes the frequency continuously as it sweeps through a frequency ramp. Typically, in an FMCW radar application a plurality of frequency ramps is generated, wherein based on the radar signals reflected back, a processing and evaluation of the plurality of frequency ramps is performed to determine the distance, speed and/or direction of objects.

The length of the signal line 140 fluctuates depending on the ambient temperature of the radar system 100. Due to the change in the length of signal line 140, the phase relationship between the first radar transceiver 110 and the second radar transceiver 120 also changes with temperature. The temperature-dependent phase change can be corrected in the processing of the signals from the radar transceivers 110 and 120 using one or more suitable calibration parameters.

The signal processing in the first radar transceiver 110 is synchronized to a first local clock signal (e.g. a digital clock signal), while the signal processing in the second radar transceiver 120 is synchronized to a second local clock signal (e.g. a digital clock signal). The first local clock signal and the second local clock signal are derived from a common local clock source. In the example embodiment shown in FIG. 1, the clock source (e.g. a local oscillator or a frequency synthesizer) is a component of the first radar transceiver 110, so that the clock signal of the clock source is received by the second radar transceiver 120 via the additional signal line 150. A clock signal derived from the clock source is also transmitted to the processing circuit 130 via the signal line 160 for synchronization purposes. In alternative example embodiments, the clock source can also be a component of the second radar transceiver 120 or the processing circuit 130.

Due to the signal propagation time over the signal line 160 during transmission of the clock signal of the clock source from the first radar transceiver 110 to the second radar transceiver 120, a time delay occurs between the first local clock signal of the first radar transceiver 110 and the second local clock signal of the second radar transceiver 120.

Figure 2:
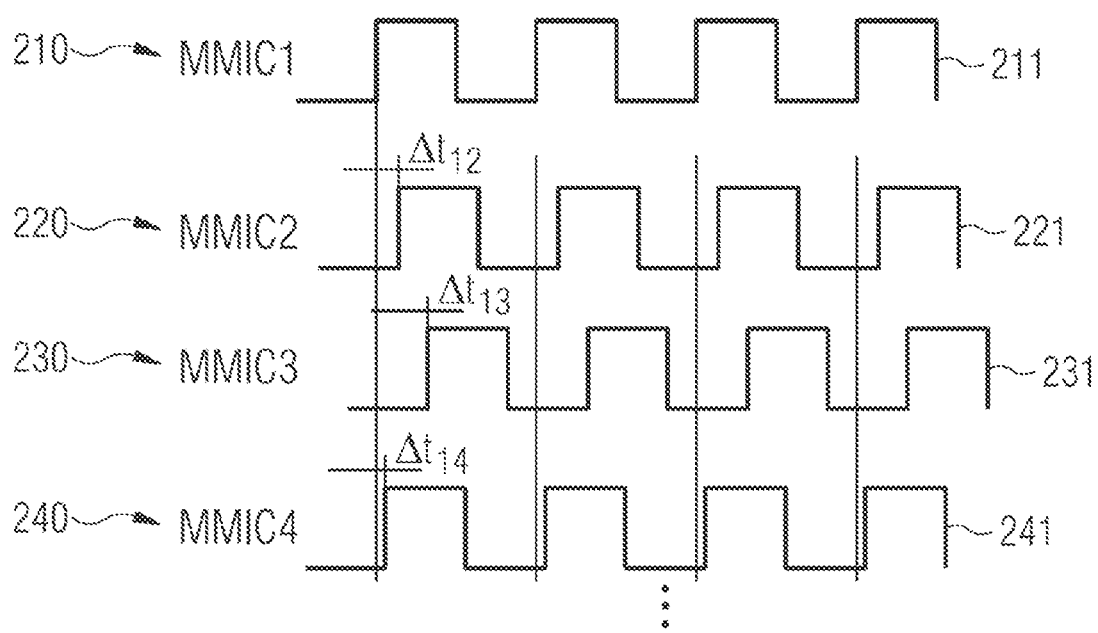
FIG. 2 shows example clock signals that are shifted relative to each other.

This is shown again in a more general form in FIG. 2 for a radar system with four radar transceivers 210, 220, 230 and 240. In FIG. 2, a radar system is assumed in which the clock source is a component of the radar transceiver 210 and the clock signal is transmitted via the respective signal lines to the other radar transceivers 220, 230 and 240. As can be seen from FIG. 2, the resulting local clock signals 221, 231 and 241 of the radar transceivers 220, 230 and 240 are delayed by the time delay $\Delta t_{12}$ $\Delta t_{13}$ or $\Delta t_{14}$ with respect to the local clock signal 211 of the radar transceiver 210.

As a result, as part of their signal processing each of the radar transceivers 210, 220, 230 and 240 samples downmixed signals (e.g. baseband signals, which can also be called IF signals) at different times (i.e. not at exactly the same time). Similarly, the radar transceivers 110 and 120 shown in FIG. 1 will therefore sample their respective downmixed signals at different times.

Figure 3:
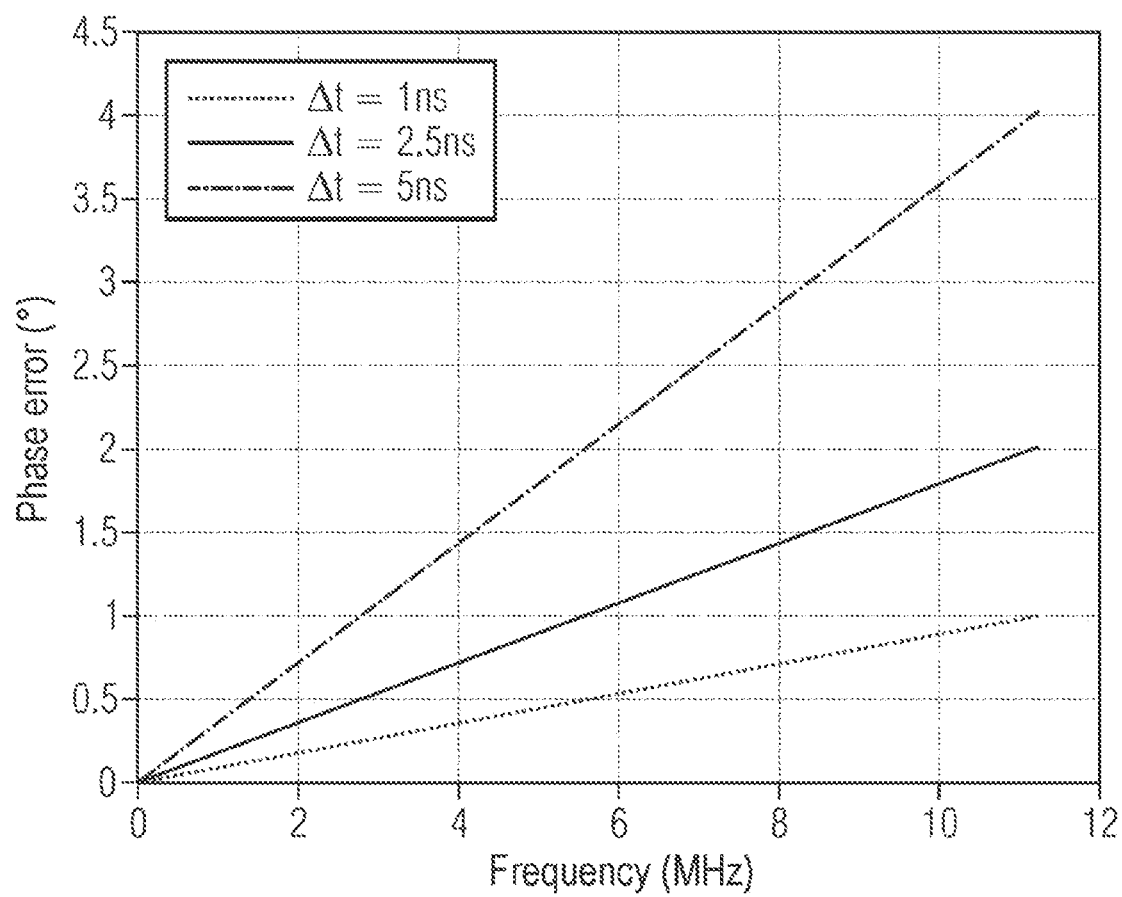
FIG. 3 shows example phase errors due to clock signals shifted relative to each other.

Depending on the frequency of the downmixed signals, this results in a phase error. Examples of this are shown in FIG. 3 for three time delays between the local clock signals of the transceivers 110 and 120. As can be seen from FIG. 3, the phase error increases with increasing frequency of the downmixed signals. The phase error also increases with increasing time delay between the local clock signals of the transceivers 110 and 120.

These phase errors can be corrected when processing the signals from the radar transceivers 110 and 120 using one or more suitable calibration parameters.

The method described below allows the determination of calibration parameters that can be used in the signal processing of the signals from transceivers 110 and 120 in order to correct the errors described above, among other things.

First of all, in the following, two calibration measurements of the proposed method are described based on FIGS. 4 to 7. Then, based on FIGS. 8 and 9, two approaches to the derivation of specific calibration parameters are described in more detail.

Figure 4:
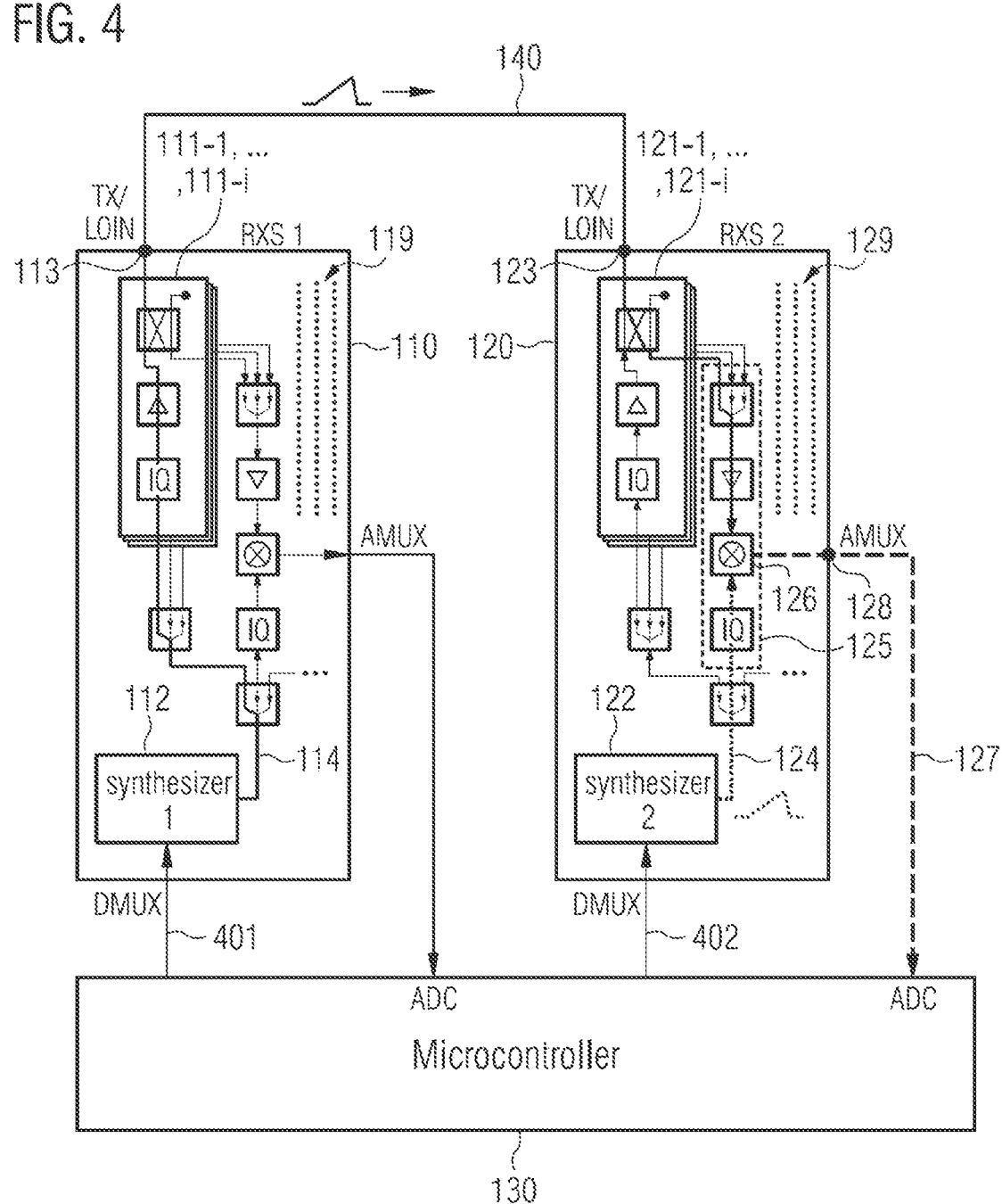
FIG. 4 shows an example embodiment of a radar system during a first calibration measurement.

FIG. 4 shows the radar transceivers 110 and 120 in detail during the first of two calibration measurements. As described above in connection with FIG. 1, the radar transceivers 110 and 120 are connected to each other via the signal line 140 and are controlled by the processing circuit 130.

As can be seen from FIG. 4, each of the radar transceivers 110 and 120 comprises a plurality of transmit and receive channels 111-1, . . . , 111-*i* or 121-1, . . . , 121-*j*. Likewise, each of the radar transceivers 110 and 120 comprises a frequency synthesizer 112 and 122 respectively.

In the example shown in FIG. 4, it is assumed that the transmission channel 111-1 is connected or coupled to a first terminal 113 of the first radar transceiver 110 and the transmission channel 121-1 is connected to a second terminal 123 of the second radar transceiver 120. The first terminal 113 is connected to the second terminal 123 via the signal line 140.

The dashed lines 119 and 129 indicate that the radar transceivers 110 and 120 may have other components or parts that are not shown. The transmitting and receiving antennas of the radar system are not shown for reasons of clarity.

Before the first calibration measurement, the same frequency ramp parameters are transmitted to the first radar transceiver 110 and to the second radar transceiver 120. The frequency ramp parameters are stored in the first radar transceiver 110 and the second radar transceiver 120 prior to the first calibration measurement. The frequency ramp parameters characterize a frequency ramp, i.e. a variation of a frequency of a signal from a minimum frequency to a maximum frequency or vice versa. For example, the frequency ramp can comprise a linear variation of the frequency. The frequency ramp parameters can specify, for example, a gradient of the frequency ramp (i.e. a change in frequency per unit time), a temporal length of the frequency ramp, a minimum frequency of the frequency ramp and/or a maximum frequency of the frequency ramp.

For the first calibration measurement, the frequency synthesizer 112 generates a first frequency-modulated oscillation signal 114 based on the frequency ramp parameters. The first oscillation signal 114 is looped through the transmission channel 111-1 to apply the first oscillation signal 114 to the first terminal 114 and thus transmit it via the signal line 140 to the second radar transceiver 120.

At the second radar transceiver 120, the first oscillation signal 114 is received via the second terminal 123 and routed from the transmission channel 121-1 into an auxiliary receive channel 125. There, the received first oscillation signal 114 is fed to a mixer 126.

For the first calibration measurement, the frequency synthesizer 122 generates a second frequency-modulated oscillation signal 124 based on the frequency ramp parameters. In other words: for the first calibration measurement both radar transceivers 110 and 120 generate a frequency-modulated oscillation signal based on the same frequency ramp parameters.

The second oscillation signal 124 is also fed to the mixer 126 to downmix the first oscillation signal 114. In other words: the second radar transceiver 120 combines the first oscillation signal 114 received via the second terminal 123 with the second oscillation signal 124. The mixer 126 accordingly generates a first difference signal 127, which has (comprises or displays) a first frequency difference between the first oscillation signal 114 and the second oscillation signal 124. The first difference signal 127 is output to the processing circuit 130 by the second radar transceiver 120. To this end, in the example embodiment shown in FIG. 4, the first difference signal 127 is fed to a terminal 128 (AMUX pin) of the second radar transceiver 120, which is connected to the processing circuit 130.

Figure 5:
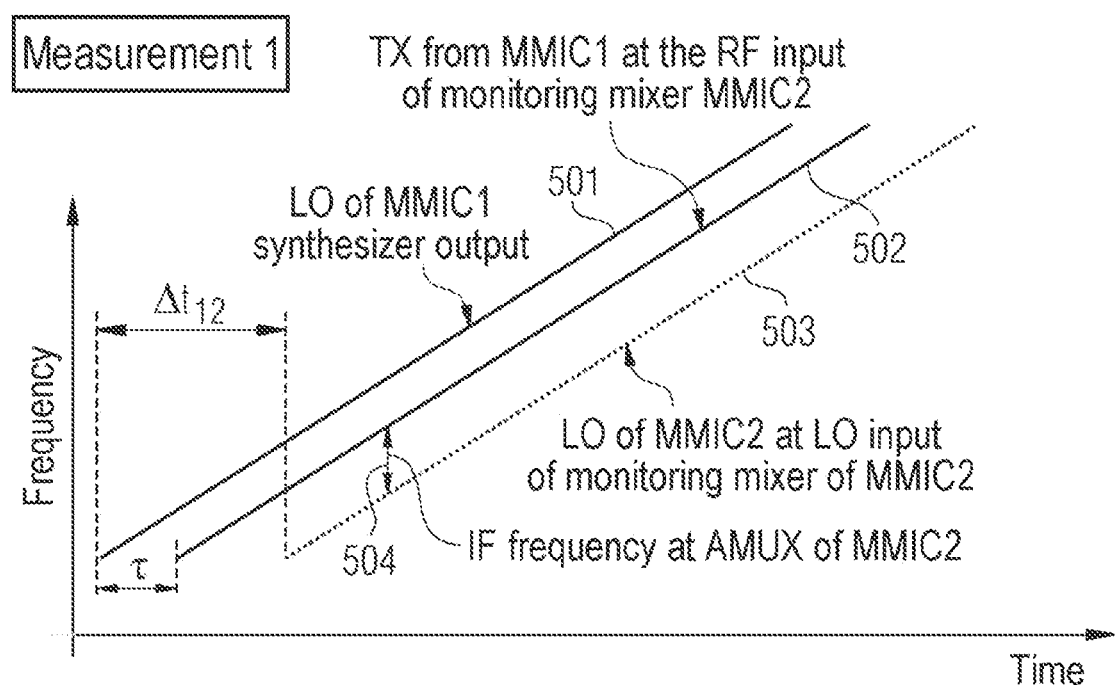
FIG. 5 shows examples of the signals that occur during the first calibration measurement.

An overview of the signals that occur during the first calibration measurement is shown in FIG. 5. FIG. 5 shows the frequency characteristic of the signals that occur during the first calibration measurement against time.

The frequency characteristic of the first oscillation signal 114 at the output of the frequency synthesizer 112 is labeled with reference sign 501, the frequency characteristic of the first oscillation signal 114 applied to the mixer 126 is labeled with reference sign 502 and the frequency characteristic of the second oscillation signal 124 applied to the mixer 126 is labeled with reference sign 503.

As can be seen from FIG. 5, the frequency characteristic of the first oscillation signal 114 applied to the mixer 126 is delayed by the time delay r compared to the frequency characteristic of the first oscillation signal 114 at the output of the frequency synthesizer 112, due to the signal propagation time over the signal line 140. Due to the time delay $\Delta t_{12}$ between the local clock signals of the radar transceivers 110 and 120, the frequency characteristic of the second oscillation signal 124 applied to the mixer 126 is also essentially delayed by the time delay $\Delta t_{12}$ relative to the frequency characteristic of the first oscillation signal 114 at the output of the frequency synthesizer 112.

The first difference signal 127 generated by the mixer 126 therefore has a frequency component which corresponds to the frequency difference labeled with reference sign 504 in FIG. 5 between the frequency characteristic of the first oscillation signal 114 applied to the mixer 126 and the frequency characteristic of the second oscillation signal 124 applied to the mixer 126.

Figure 6:
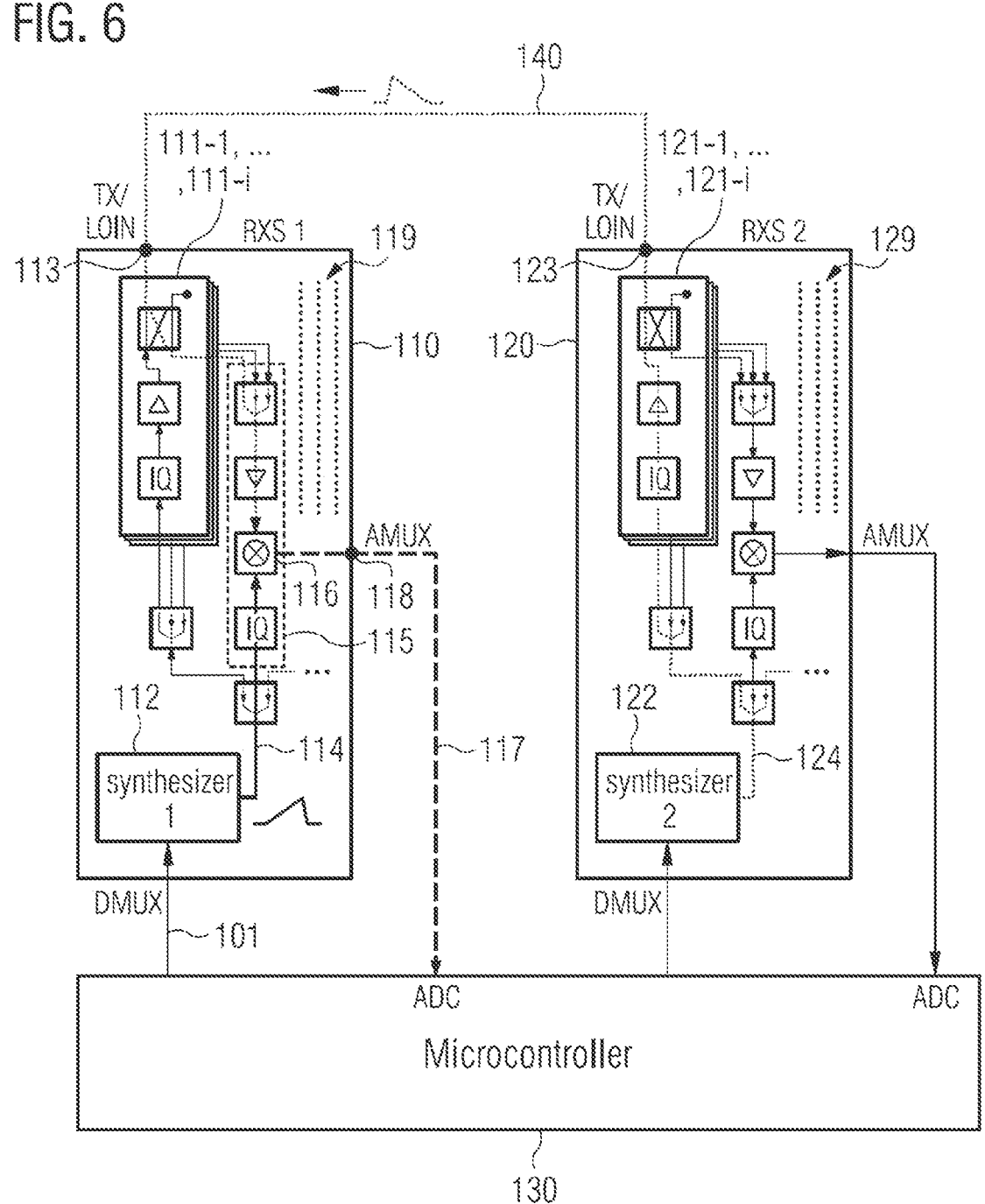
FIG. 6 shows an example embodiment of the radar system shown in FIG. 4 during a second calibration measurement.

For the second calibration measurement, the radar transceivers 110 and 120 now swap roles. This is illustrated in FIG. 6.

For the second calibration measurement, the frequency synthesizer 122 in turn generates the second frequency-modulated oscillation signal 124 based on the frequency ramp parameters. For example, the frequency synthesizer 122 can generate the second frequency-modulated oscillation signal 124 continuously for the first and second calibration measurements. Alternatively, the process of generating the second frequency-modulated oscillation signal 124 can also be interrupted or paused between the first and the second calibration measurement.

The first oscillation signal 124 is looped through the transmission channel 121-1 to apply the second oscillation signal 124 to the second terminal 124 for the second calibration measurement, and thus transmit it to the first radar transceiver 110 via the signal line 140.

At the first radar transceiver 110, the second oscillation signal 124 is received via the first terminal 113 and routed from the transmission channel 111-1 into an auxiliary receive channel 115. There, the received second oscillation signal 124 is fed to a mixer 116.

For the second calibration measurement, the frequency synthesizer 112 in turn generates the first frequency-modulated oscillation signal 114 based on the frequency ramp parameters. In other words: for the second calibration measurement both radar transceivers 110 and 120 also generate a frequency-modulated oscillation signal based on the same frequency ramp parameters as for the first calibration measurement. As described above for the second frequency-modulated oscillation signal 114, the first frequency-modulated oscillation signal 114 can be generated continuously for the two calibration measurements or the generation can be interrupted or paused between the two calibration measurements.

The first oscillation signal 114 is also fed to the mixer 116 to mix down the second oscillation signal 124. In other words: the first radar transceiver 110 combines the second oscillation signal 124 received via the first terminal 113 with the second oscillation signal 114. The mixer 116 accordingly generates a second difference signal 117, which has (comprises or displays) a second frequency difference between the first oscillation signal 114 and the second oscillation signal 124. The second difference signal 117 is output to the processing circuit 130 by the first radar transceiver 110. To this end, in the example embodiment shown in FIG. 6 the second difference signal 117 is fed to a terminal 118 (AMUX pin) of the first radar transceiver 110, which is connected to the processing circuit 130.

Figure 7:
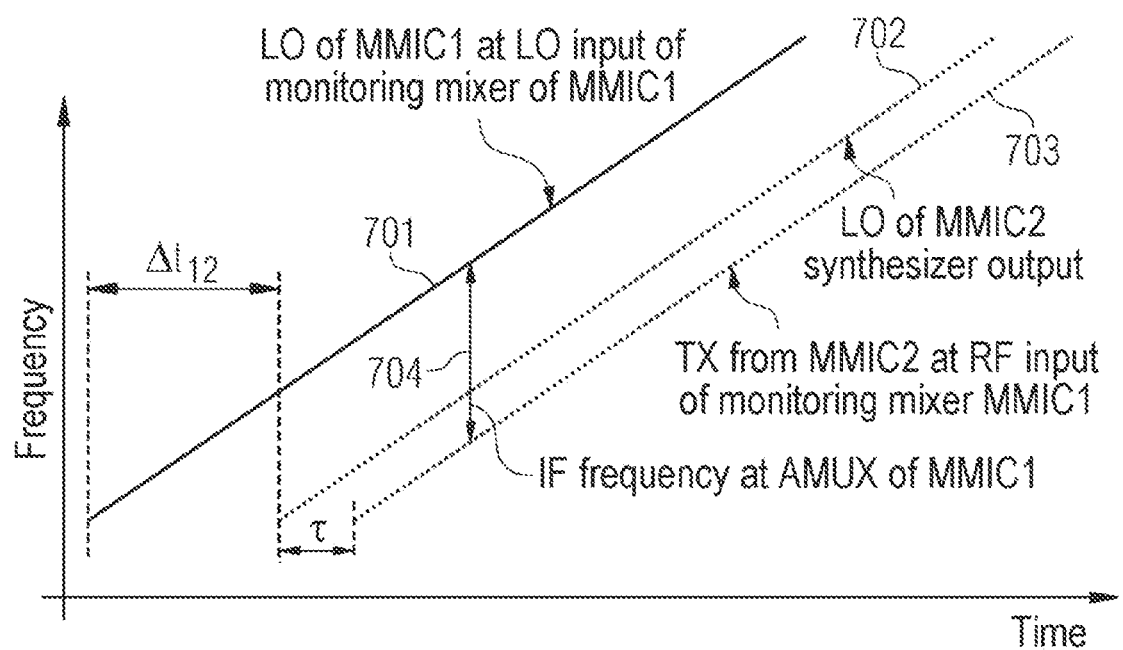
FIG. 7 shows examples of the signals that occur during the second calibration measurement.

An overview of the signals that occur during the second calibration measurement is shown in FIG. 7. FIG. 7 shows the frequency characteristic of each signal that occurs during the second calibration measurement against time.

The frequency characteristic of the first oscillation signal 114 applied to the mixer 116 is labeled with reference sign 701, the frequency characteristic of the second oscillation signal 124 at the output of the frequency synthesizer 122 is labeled with reference sign 502 and the frequency characteristic of the second oscillation signal 124 applied to the mixer 116 is labeled with reference sign 703.

As can be seen from FIG. 7, due to the time delay $\Delta t_{12}$ between the local clock signals of the radar transceivers 110 and 120, the frequency characteristic of the second oscillation signal 124 at the output of the frequency synthesizer 122 is essentially also delayed by the time delay $\Delta t_{12}$ relative to the first oscillation signal 114 applied to the mixer 116. Due to the signal propagation time over the signal line 140, the frequency characteristic of the second oscillation signal 124 applied to the mixer 116 is delayed by the time delay r compared to the frequency characteristic of the second oscillation signal 124 at the output of the frequency synthesizer 122.

The second difference signal 117 generated by the mixer 116 therefore has a frequency component which corresponds to the frequency difference labeled with reference sign 704 in FIG. 7 between the frequency characteristic of the first oscillation signal 114 applied to the mixer 116 and the frequency characteristic of the second oscillation signal 124 applied to the mixer 116.

The two difference signals 117 and 127 can be understood as IF signals or baseband signals.

The two difference signals 117 and 127 are further processed by the processing circuit 130 in order to determine at least one calibration parameter based on the first difference signal 117 and the second difference signal 127. As indicated in FIGS. 4 and 6, the processing circuit 130 can have one or more analog-to-digital converters (ADC) in order to convert the analog difference signals 117 and 127 into digital signals first and then to determine from them the at least one calibration parameter based on the digitized signals.

As already indicated above, the radar transceivers 110 and 120 are controlled by the processing circuit 130. In particular, the generation of the first or second frequency-modulated oscillation signal 114, 124 in the respective radar transceiver 110 or 120 is initiated (triggered) by the processing circuit 130. For the first calibration measurement, the first radar transceiver 110 is activated via a first signal 401 and the second radar receiver 120 is activated via a second signal 402. For the second calibration measurement also, the radar transceivers 110 and 120 are activated accordingly by the processing circuit 130.

For example, the first signal 401 and the second signal 402 can be output to the first radar transceiver 110 and the second radar transceiver 120 simultaneously. Alternatively, the second signal 402 can be output to the second radar transceiver 120 time-delayed relative to the first signal 401.

If the second signal 402 is output to the second radar transceiver 120 time-delayed relative to the first signal 401, the second signal 402 can be output to the second radar transceiver 120 with a delay, in particular by one or more clock cycles of the local clock signal of the second radar transceiver 110 (or of the first radar transceiver 110), relative to the output of the first signal 401. Since the length of the distribution line 140 is often essentially the length of the distribution line 150 for the clock signal of the clock source, due to the delay by one or more clock cycles of the local clock signal it is possible to ensure that the frequencies of the two difference signals 117 and 127 are in the usable band of the ADC or the ADCs of the processing circuit 130.

In summary, it can therefore be concluded that according to the proposed method, an external frequency ramp is measured in both directions by means of an internal frequency ramp by the radar transceivers 110 and 120. This enables the electrical distance of the signal line 140 to be measured very precisely. In particular, both MMICs 198 and 199 are initially configured with the same frequency ramp parameters. The radio-frequency output drivers in the transmission channel 111-1 of the first radar transceiver 110 are switched on during the first calibration measurement, while the radio-frequency output drivers in the transmission channel 121-1 of the second radar transceiver 120 are switched off during the first calibration measurement. Furthermore, the radar transceiver 120 is configured such that the incoming oscillation signal is applied to the RF input of the monitoring mixer 126. The processing circuit 130 (e.g. designed as a microcontroller) then triggers both MMICs using the (e.g. digital) signals 401 and 402. Simultaneous triggering is not required, as described above. The processing circuit 130 then samples the difference signal 127 provided by the second radar transceiver 120. The measurement is then repeated with the reverse settings.

The proposed method uses the existing components of the radar system. Only the two difference signals 117 and 127 must additionally be fed to the processing circuit 130. This can be carried out, for example, via appropriate signal lines between terminals already available on the radar transceivers 110 and 120 and the processing circuit 130. The radar transceivers 110 and 120 are operated in sequence according to the principles described above in order to obtain the two difference signals 117 and 127. The proposed method allows a high precision in the measurement as well as short calibration times of at least two calibration ramps only (e.g. <1 ms). In addition, only components already existing in the radar system are used. In particular, no self-feeding, which blocks further transmission channels, is necessary. Apart from the transmission channels which are used during the radar measurement anyway for distributing the common oscillation signal, all the remaining transmission channels are thus available for their actual task (i.e. for the emission of radar signals).

While the previous embodiments are mainly related to the two calibration measurements for obtaining the two difference signals, the evaluation of the two difference signals by the processing circuit 130 is described below in more detail.

Depending on the calibration measurement, each of the radar transceivers 110 and 120 generates either an oscillation signal which is only used internally for downmixing, or an oscillation signal which is transmitted via the signal line 140 to the other radar transceiver. The respective oscillation signal which is only used internally for downmixing is denoted below by $s_{LO,m}(t)$. For the respective oscillation signal which is transmitted via the signal line 140 to the respective other radar transceiver, the term $s_{Tx,m}(t)$ is used in the following. The index m denotes the respective radar transceiver (e.g. "1" denotes the first radar transceiver 110 and "2" denotes the second radar transceiver 120).

Depending on the calibration measurement, each of the radar transceivers 110 and 120 thus generates one of the following two signals:

$$s_{TX,m}(t) = A \cos((\varphi_{Tx,m}(t))) \tag{1}$$

$$s_{LO,m}(t) = A \cos(\varphi_{LO,m}(t)) \tag{2}$$

where A denotes the constant amplitude of the signal and t the continuous time.

The time-dependent phase $\varphi_{Tx,m}(t)$ with a trigger delay can be described as follows for linear frequency ramps:

$$\varphi_{Tx,m}(t) = 2\pi[(f_0 - k_r \Delta t_m)t - \tfrac{1}{2}k_r t^2] + \varphi_{0,m} + \Phi_m(t) \tag{3}$$

where $f_0$ denotes the starting frequency of the frequency ramp, $k_r$ the slope of the frequency ramp, $\Delta t_m$ the time delay of the ramp start, $\varphi_{0,m}$ the random starting phase of the signal $\varphi_{Tx,m}(t)$ and $\Phi_m(t)$ denotes the deviation of the actual frequency ramp from an ideal frequency ramp. For the sake of simplicity, the term $\Phi_m(t)$ is no longer taken into account.

The time-dependent phase $\varphi_{LO,m}(t)$ can be described in the same way as the mathematical expression (3).

Due to the mixing of the two signals at the mixer 116 or at the mixer 126, the following phase equations are obtained for the difference signals for the two calibration measurements (RF frequencies of the difference signals mixed upwards can be filtered and are therefore ignored in the analysis).

For the first difference signal 127 of the first calibration measurement generated by the second radar transceiver 120 (i.e. m=2), the following is obtained:

$$\varphi_{Diff,2}(t)s_{LO,2}(t) - s_{TX,1}(t-T) = -2\pi k_r(\Delta t_{12} - \tau)t + \varphi_{c,2} \tag{4}$$

For the second difference signal 117 of the second calibration measurement generated by the first radar transceiver 110 (i.e. m=1), the following is obtained:

$$\varphi_{Diff,1}(t) = s_{LO,1}(t) - s_{TX,2}(t-T) = -2\pi k_r(\Delta t_{12} + \tau)t + \varphi_{c,1} \tag{5}$$

Here $\Delta t_m$ has been set to zero in each case so that $\Delta t_{12}$ is equal to the delay in the ramp start between the radar transceivers 110 and 120.

By differentiating, the first difference frequency $f_{Diff,2}$ which is indicated by the first difference signals is obtained, or the second difference frequency $f_{Diff,1}$ which is indicated by the second difference signals:

$$|f_{Diff,2}| = \frac{1}{2\pi} \left| \frac{d\varphi_{Diff,2}(t)}{dt} \right| = k_r(\Delta t_{12} - \tau) \tag{6}$$

$$|f_{Diff,1}| = \frac{1}{2\pi} \left| \frac{d\varphi_{Diff,1}(t)}{dt} \right| = k_r(\Delta t_{12} + \tau) \tag{7}$$

As is evident from the mathematical expressions (6) and (7), two IF or baseband frequencies, which are centered around $k_r \Delta t_{12}$, are obtained for the two difference frequencies.

Thus, the internal time delay of the second radar transceiver 120 relative to the first radar transceiver 110 due to the time delay between the local clock signals of the radar transceivers 110 and 120 can be determined by adding the two frequency peaks:

$$\Delta t_{12} = \frac{f_{Diff,1} + f_{Diff,2}}{2k_r} \quad (8)$$

It follows that the signal propagation time τ over the signal line 140 can be determined by subtracting the two frequency peaks:

$$\tau = \frac{f_{Diff,1} - f_{Diff,2}}{2k_r} \quad (9)$$

The time delay $\Delta t_{12}$ is thus determined based on a ratio of the gradient of the frequency ramp to the sum of the first frequency difference and the second frequency difference. By contrast, the signal propagation time τ is determined based on the ratio of a gradient of the frequency ramp to the difference between the first frequency difference and the second frequency difference.

Figure 8:
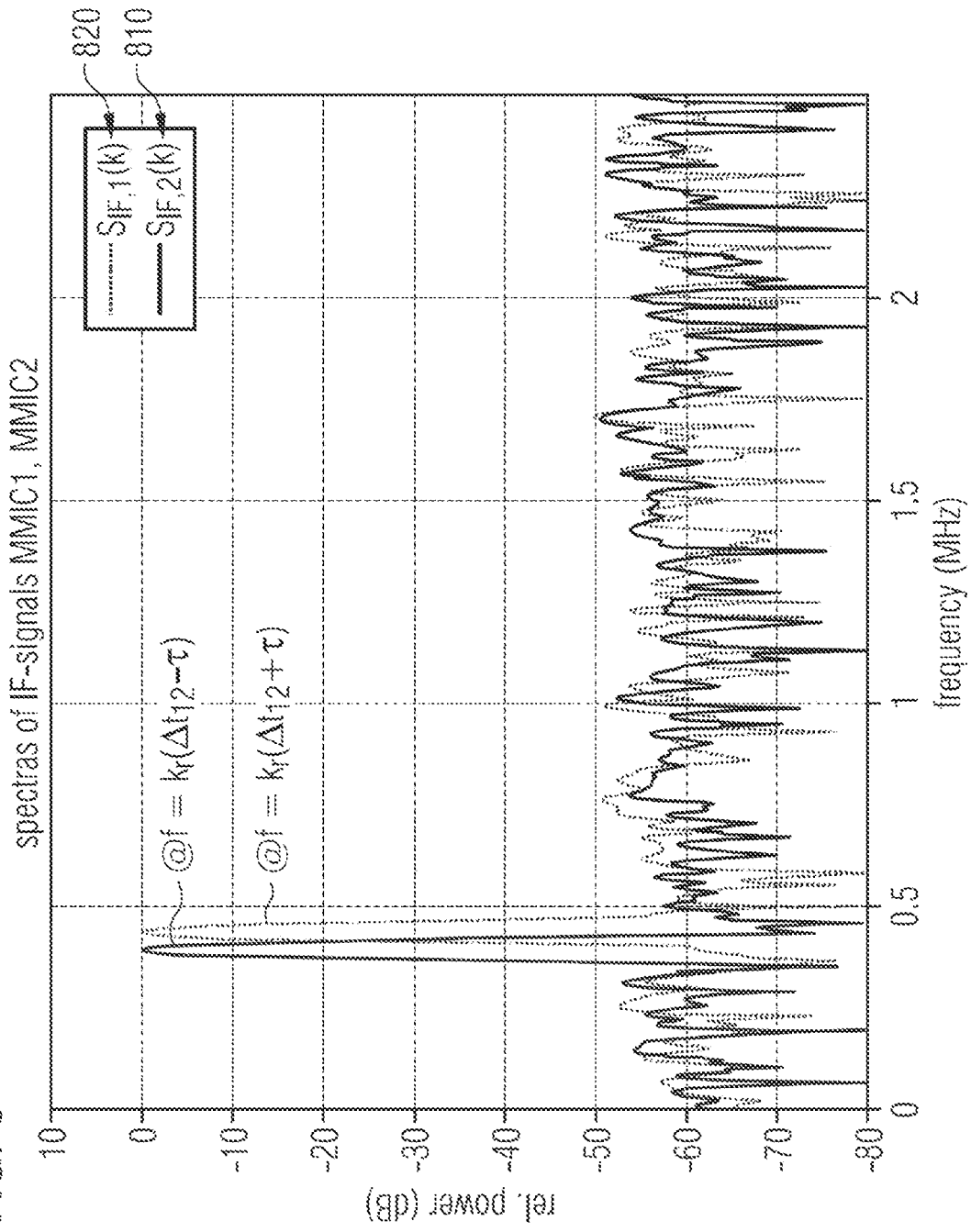
FIG. 8 shows sample spectra of two difference signals.

Example spectra of the two difference signals 117 and 127 are shown in FIG. 8. The spectrum of the first difference signal 127 is labeled with the reference sign 810, while the spectrum of the second difference signal 117 is labeled with the reference sign 820. As is evident from FIG. 8, the frequency peaks of the two spectra are centered around $k_r \Delta t_{12}$.

An improvement in the measurement of the signal propagation time τ can be achieved with further processing steps for the difference signals 117 and 127. For this purpose, the processing circuit 130 derives a first analytical signal $s_{Diff,2}^+$ from the first difference signal 127 and also a second analytical signal $s_{Diff,1}^+$ from the second difference signal 117. In other words: the processing circuit 130 converts the sampled difference signals 117 and 127 into analytical signals. The term "analytical signal" refers to a complex-valued function of time, the imaginary part of which is the Hilbert transform of the real part.

The first analytical signal $s_{Diff,2}^+$ is then multiplied by the second analytical signal $s_{Diff,1}^+$ to obtain a combined signal $s_\tau(t)$:

$$s_\tau(t) = s_{Diff,1}^+(t) s_{Diff,2}^+(t) = e^{j(\varphi_{Diff,1}(t) + \varphi_{Diff,2}(t))} = e^{j4\pi k_r \tau t} e^{j\varphi_{c+}} \quad (10)$$

where $\varphi_{c+} = \varphi_{c1} + \varphi_{c2}$ denotes a constant phase term. The mathematical expression (10) shows that the combined signal $s_\tau(t)$ has a frequency peak at $2k_r \tau$, which can be determined, for example, by means of a discrete Fourier transform (DFT) of the combined signal $s_\tau(t)$. The signal propagation time τ over the signal line 14 can then be determined as follows:

$$\tau = \frac{f}{2k_r} \quad (11)$$

In the mathematical expression 11, f denotes the frequency of the frequency peak in the combined signal $s_\tau(t)$. The signal propagation time τ is therefore determined based on both the gradient of the frequency ramp and the frequency of the frequency peak in the combined signal $s_\tau(t)$.

Since in the radar system shown above the frequency ramps are exchanged between the radar transceivers 110 and 120 via the signal line 140 and not through the air, the frequency determination of the combined signal $s_\tau(t)$ is extremely accurate and not distorted by multi-path effects, for example.

Similarly, the time delay $\Delta t_{12}$ can also be determined from the first analytical signal $s_{Diff,2}^+$ and the second analytical signal $s_{Diff,1}^+$. To determine the time delay $\Delta t_{12}$, the second analytical signal $s_{Diff,1}^+$ is multiplied by the complex conjugate of the first analytical signal $s_{Diff,2}^+$ to obtain a combined signal $s_{\Delta t_{12}}(t)$:

$$s_{\Delta t_{12}}(t) = s_{Diff,1}^+(t) \overline{s_{Diff,2}^+(t)} = e^{j(\varphi_{Diff,1}(t) - \varphi_{Diff,2}(t))} = e^{j4\pi k_r \Delta t_{12} t} e^{j\varphi_{c-}} \quad (12)$$

where again $\varphi_{c-} = \varphi_{c1} - \varphi_{c2}$ denotes a constant phase term. The mathematical expression (12) shows that the combined signal $s_{\Delta t_{12}}(t)$ has a frequency peak at $2k_r \Delta t_{12}$, which can be determined, for example, by means of a discrete Fourier transform (DFT) of the combined signal $s_{\Delta t_{12}}(t)$. The time delay $\Delta t_{12}$ can then be determined from this as follows:

$$\Delta t_{12} = \frac{f}{2k_r} \quad (13)$$

In the mathematical expression (13), f denotes the frequency of the frequency peak in the combined signal $s_{\Delta t_{12}}(t)$. The delay $\Delta t_{12}$ is therefore determined based on both the gradient of the frequency ramp and the frequency of the frequency peak in the combined signal $s_{\Delta t_{12}}(t)$.

Figure 9:
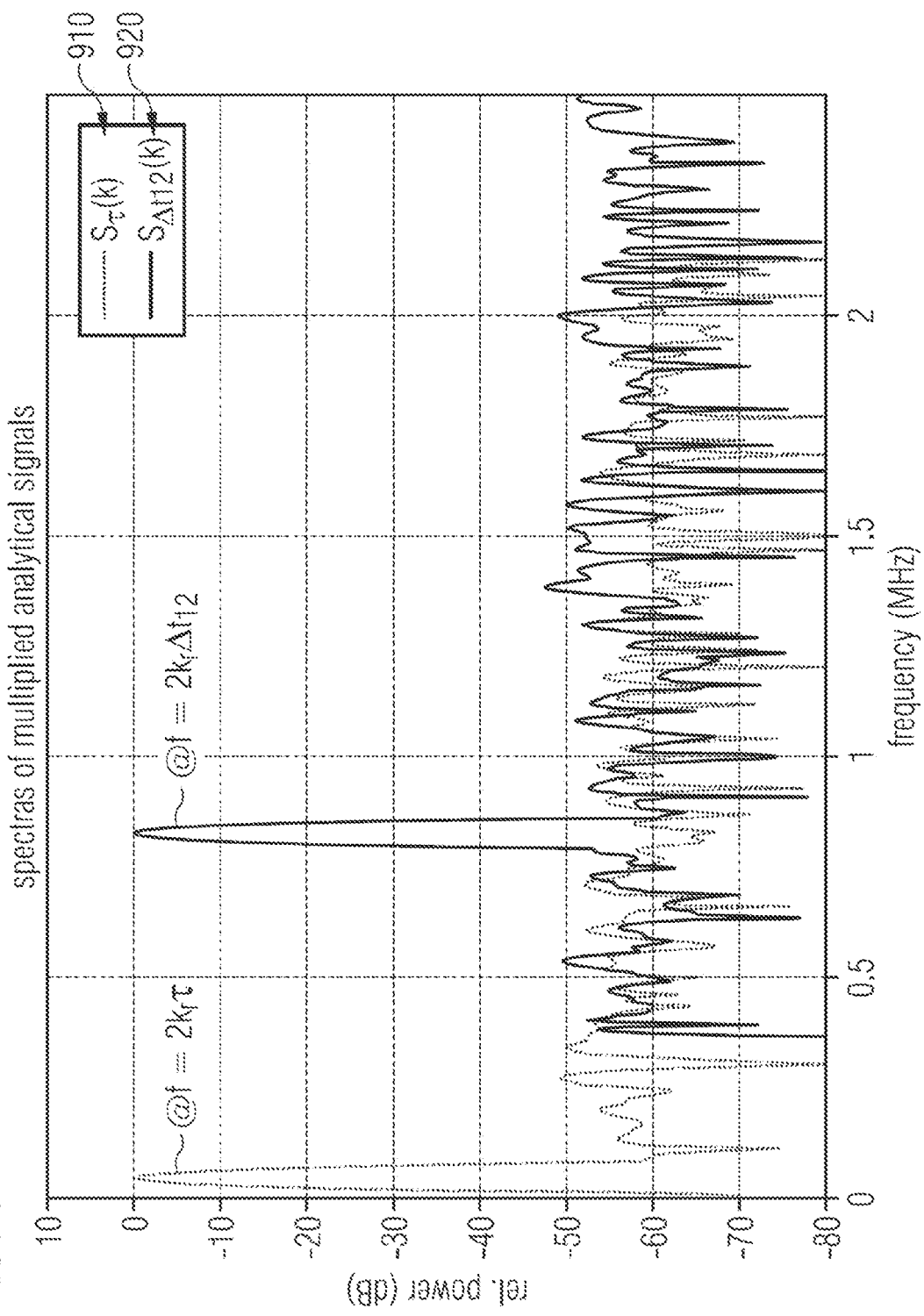
FIG. 9 shows sample spectra of two signals that are derived from two difference signals.

Example spectra of the combined signals $s_\tau(t)$ and $s_{\Delta t_{12}}(t)$ are shown in FIG. 9. The spectrum of the combined signal $s_\tau(t)$ is labeled with reference sign 910, while the spectrum of the combined signal $s_{\Delta t_{12}}(t)$ is labeled as reference sign 920.

The signal propagation time τ and the time delay $\Delta t_{12}$ are two calibration parameters, which can be used to correct the errors described above in connection with FIGS. 1 to 3. As shown in the above comments, the calibration parameters can be determined with high precision and with short calibration times according to the proposed method. Only existing components of the radar system are required or used for this purpose.

Figure 10:
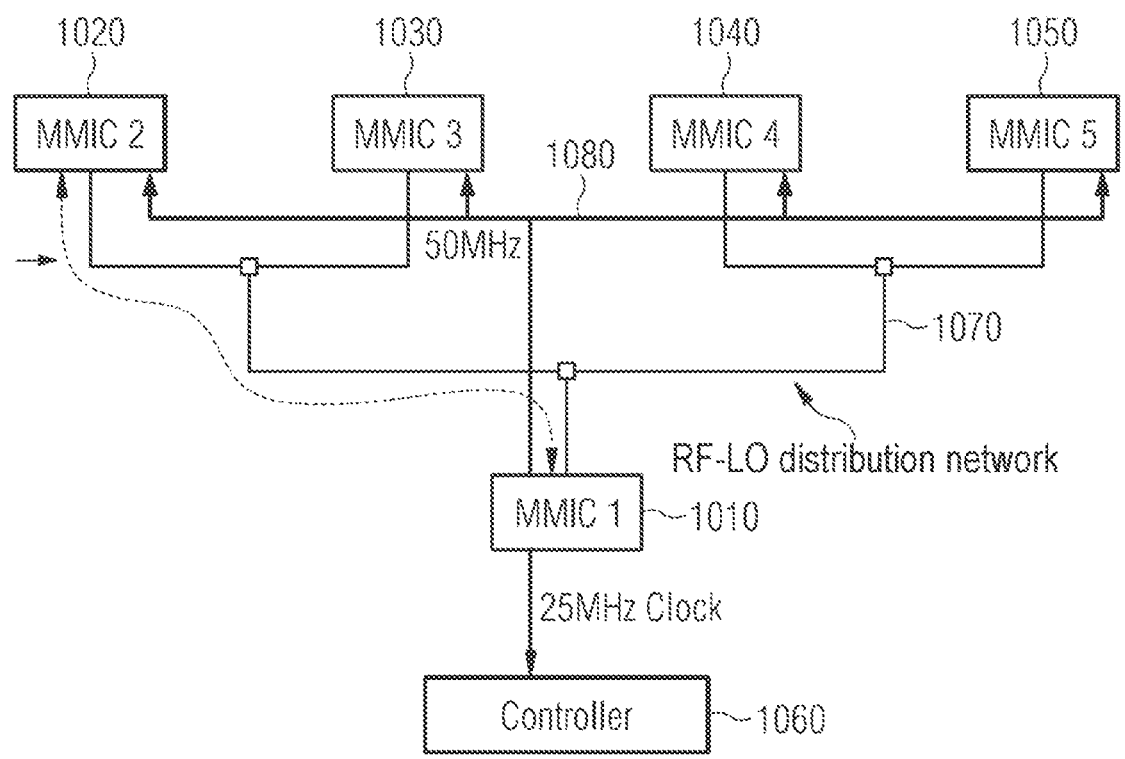
FIG. 10 shows an example embodiment of another radar system.

In the embodiments above, reference has always been made to a radar system with two radar transceivers. It should be noted, however, that the proposed method can also be used for radar systems with more than two radar transceivers. An example of this is shown in FIG. 10 for a radar system 1000 with five radar transceivers 1010, 1020, 1030, 1040 and 1050. The radar transceivers 1010, 1020, 1030, 1040 and 1050 are controlled by the processing circuit 1060 in the same way as the above embodiments.

As with the above embodiments, for each of the radar transceivers 1020, 1030, 1040 and 1050, the exact electrical distance to the radar transceiver 1010 or the signal propagation time can be determined using the associated section of the signal distribution network 1070. Similarly, as with the above embodiments, for each of the radar transceivers 1020, 1030, 1040 and 1050 the time delay of its respective local clock signal relative to the local clock signal of the radar transceiver 1010 can be determined (the local clock signals in this case are derived from a clock signal of a clock source transmitted via the signal line 1080).

Accordingly, calibration parameters for error correction can also be provided for radar systems with more than two radar transceivers.

It should also be noted that in some example embodiments the oscillation signal distributed between the radar transceivers can have a frequency that is lower by a predetermined factor than the oscillation signal emitted via the radar antennas for radar measurement—as already mentioned above.

Figure 11:
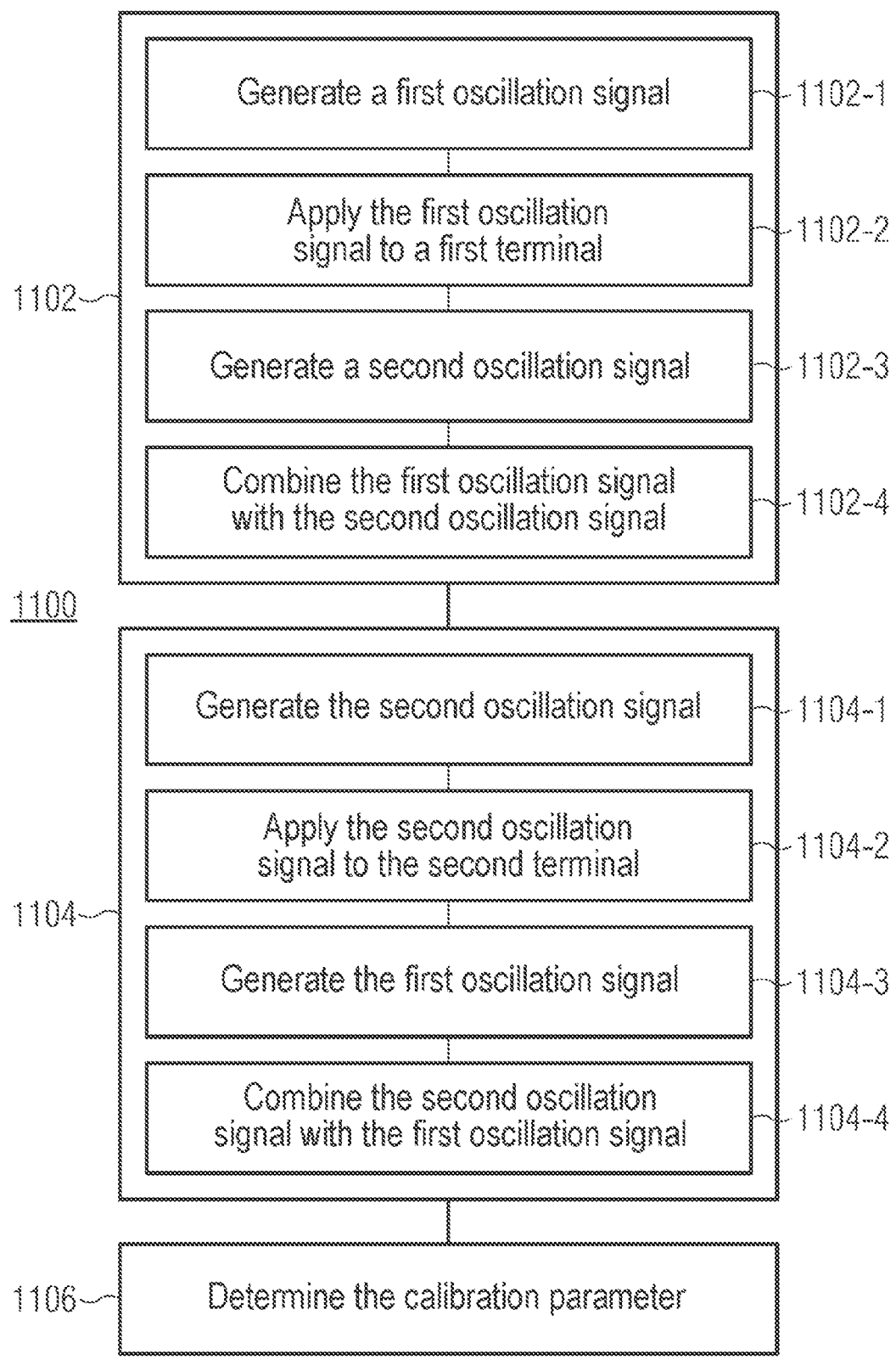
FIG. 11 shows a flowchart of an example embodiment of a method for determining at least one calibration parameter for a radar system.

In order to summarize again the aspects described above for determining calibration parameters for a radar system with a plurality of radar transceivers, FIG. 11 shows another flowchart of a method 1100 for determining at least one calibration parameter for a radar system having at least one first radar transceiver and a second radar transceiver.

The method 1100 comprises carrying out 1102 a first calibration measurement. The first calibration measurement comprises generating 1102-1 a first frequency-modulated oscillation signal by means of the first radar transceiver based on frequency ramp parameters that characterize a frequency ramp. In addition, the first calibration measurement comprises applying 1102-2 the first frequency-modulated oscillation signal to a first terminal of the first radar transceiver. The first terminal is connected to a second terminal of the second radar transceiver via a signal line. The first calibration measurement also comprises generating 1102-3 a second frequency-modulated oscillation signal by means of the second radar transceiver based on the frequency ramp parameters. In addition, the first calibration measurement comprises combining 1102-4 the first oscillation signal received via the second terminal with the second oscillation signal by means of the second radar transceiver, in order to generate a first difference signal having a first frequency difference between the first oscillation signal and the second oscillation signal.

The method 1100 also comprises carrying out 1104 a second calibration measurement. The second calibration measurement comprises generating 1104-1 the second frequency-modulated oscillation signal by means of the second radar transceiver based on the frequency ramp parameters. Furthermore, the second calibration measurement comprises applying 1104-2 the second frequency-modulated oscillation signal to the second terminal. In addition, the second calibration measurement comprises generating 1104-3 the first frequency-modulated oscillation signal by means of the first radar transceiver based on the frequency ramp parameters. The second calibration measurement also comprises combining 1104-4 the second oscillation signal received via the first terminal with the first oscillation signal by means of the first radar transceiver, in order to generate a second difference signal having a second frequency difference between the first oscillation signal and the second oscillation signal.

The method 1100 also comprises determining 1106 the at least one calibration parameter based on the first difference signal and the second difference signal.

Further details and aspects of the method are described above in connection with further example embodiments (e.g., FIGS. 1 to 10). The method may comprise one or more optional features as specified in the other example embodiments.

The example embodiments described herein can be summarized as follows:

Some example embodiments relate to a method for determining at least one calibration parameter for a radar system having at least one first radar transceiver and a second radar transceiver. The method comprises performing a first calibration measurement. The first calibration measurement comprises generating a first frequency-modulated oscillation signal by means of the first radar transceiver based on frequency ramp parameters that characterize a frequency ramp. In addition, the first calibration measurement comprises applying the first frequency-modulated oscillation signal to a first terminal of the first radar transceiver. The first terminal is connected to a second terminal of the second radar transceiver via a signal line. The first calibration measurement also comprises generating a second frequency-modulated oscillation signal by means of the second radar transceiver based on the frequency ramp parameters. In addition, the first calibration measurement comprises combining the first oscillation signal received via the second terminal with the second oscillation signal by means of the second radar transceiver in order to generate a first difference signal having a first frequency difference between the first oscillation signal and the second oscillation signal. The method also comprises carrying out a second calibration measurement. The second calibration measurement comprises generating the second frequency modulated oscillation signal by means of the second radar transceiver based on the frequency ramp parameters. Furthermore, the second calibration measurement comprises applying the second frequency-modulated oscillation signal to the second terminal. In addition, the second calibration measurement comprises generating the first frequency-modulated oscillation signal by means of the first radar transceiver based on the frequency ramp parameters. The second calibration measurement also comprises combining the second oscillation signal received via the first terminal with the first oscillation signal by means of the first radar transceiver, in order to generate a second difference signal having a second frequency difference between the first oscillation signal and the second oscillation signal. The method also comprises determining the at least one calibration parameter based on the first difference signal and the second difference signal.

In some example embodiments, for the first calibration measurement the first radar transceiver is activated via a first signal and the second radar receiver is activated via a second signal, in order to trigger the generation of the first or second frequency-modulated oscillation signal in the respective transceiver.

For example, the first signal and the second signal can be output to the first radar transceiver and the second radar transceiver simultaneously.

Alternatively, the second signal is output to the second radar transceiver with a time delay relative to the first signal.

According to some example embodiments, the signal processing of the second radar transceiver is synchronized to a local clock signal, wherein the second signal is output to the second radar transceiver delayed by one or more clock cycles of the local clock signal relative to the output of the first signal.

In some example embodiments, the local clock signal and a further local clock signal, to which the signal processing of the first radar transceiver is synchronized, are derived from one clock source.

According to some example embodiments, the at least one calibration parameter is a signal propagation time over the signal line.

In some example embodiments, the signal propagation time is determined based on a ratio of a gradient of the frequency ramp to a difference between the first frequency difference and the second frequency difference.

According to some example embodiments, determining the signal propagation time comprises the following: deriving a first analytical signal from the first difference signal; deriving a second analytical signal from the second difference signal; multiplying the first analytical signal by the second analytical signal to obtain a first combined signal; determining a first frequency peak in the first combined signal; and determining the signal propagation time based on both a frequency of the first frequency peak and a gradient of the frequency ramp.

In alternative example embodiments, the at least one calibration parameter is a time delay between a first local clock signal, which is used by the first radar transceiver for synchronizing its signal processing, and a second local clock signal which is used by the second radar transceiver for synchronizing its signal processing.

In some example embodiments, the time delay is determined based on a ratio of a gradient of the frequency ramp to a sum of the first frequency difference and the second frequency difference.

In some example embodiments, determining the time delay comprises the following: deriving a first analytical signal from the first difference signal; deriving a second analytical signal from the second difference signal; multiplying the second analytical signal by the complex conjugate of the first analytical signal to obtain a second combined signal; determining a second frequency peak in the second combined signal; and determining the signal time delay time based on both a frequency of the second frequency peak and a gradient of the frequency ramp.

According to some example embodiments, the method also comprises: transmitting the same frequency ramp parameters to the first radar transceiver and the second radar transceiver prior to the first calibration measurement; and storing the frequency ramp parameters by means of the first radar transceiver and the second radar transceiver prior to the first calibration measurement.

In some example embodiments, the signal line is a cable for transmitting an oscillation signal derived from a local oscillator from the first radar transceiver to the second radar transceiver during a radar measurement.

According to some example embodiments, the first radar transceiver is formed on a first semiconductor chip, while the second radar transceiver is formed on a second semiconductor chip.

Further example embodiments relate to a radar system comprising a first radar transceiver, a second radar transceiver and a processing circuit. The processing circuit is configured, for a first calibration measurement, to activate the first radar transceiver to generate a first frequency-modulated oscillation signal based on frequency ramp parameters that characterize a frequency ramp, and to apply it to a first terminal of the first radar transceiver. The first terminal is connected to a second terminal of the second radar transceiver via a signal line. Furthermore, the processing circuit is configured to activate the second radar transceiver to generate a second frequency-modulated oscillation signal based on the frequency ramp parameters for the first calibration measurement, and to combine the first oscillation signal received via the second terminal with the second oscillation signal in order to generate a first difference signal having a first frequency difference between the first oscillation signal and the second oscillation signal. The processing circuit is also configured to activate the second radar transceiver to generate the second oscillation signal based on the frequency ramp parameters for a second calibration measurement and to apply said oscillation signal to the second terminal. Furthermore, for the second calibration measurement the processing circuit is configured to activate the first radar transceiver to generate the first oscillation signal based on the frequency ramp parameters, and to combine the second oscillation signal received via the first terminal with the first oscillation signal in order to generate a second difference signal having a second frequency difference between the first oscillation signal and the second oscillation signal. The processing circuit is configured to determine at least one calibration parameter based on the first difference signal and the second difference signal.

In some example embodiments, for the first calibration measurement the processing circuit is configured to activate the first radar transceiver via a first signal and to activate the second radar transceiver via a second signal, in order to trigger the generation of the first or second frequency-modulated oscillation signal in the respective radar transceiver.

According to some example embodiments, the processing circuit is configured: to output the first signal and the second signal to the first radar transceiver and the second radar transceiver simultaneously; or to output the second signal to the second radar transceiver with a time delay relative to the first signal.

In some example embodiments, the signal line is a cable for transmitting an oscillation signal derived from a local oscillator from the first radar transceiver to the second radar transceiver during a radar measurement.

According to some example embodiments, the first radar transceiver is formed on a first semiconductor chip, while the second radar transceiver is formed on a second semiconductor chip.

The aspects and features which are described together with one or more of the previously outlined examples and figures can also be combined with one or more of the other examples in order to replace an identical feature of the other example or to introduce the feature into the other example as an addition.

The description and drawings illustrate only the basic principles of the disclosure. Furthermore, all the examples listed here are intended explicitly for illustrative purposes only, to assist the reader in understanding the principles of the disclosure and the concepts contributed by the inventor(s) for the further development of the technology. All statements made here concerning principles, aspects and examples of the disclosure, as well as concrete examples of the same, comprise their equivalents.

A block diagram can represent, for example, a rough circuit diagram which implements the principles of the disclosure. Similarly, a flow chart, a program flow diagram, a state transition diagram, a pseudo-code and the like can represent different processes, operations or steps which are essentially represented, for example, in computer-readable medium and thus executed by a computer or processor, regardless of whether such a computer or processor is explicitly shown. Methods disclosed in the description or in the patent claims can be implemented by a component which has a means for executing each one of the respective steps of these methods.

It goes without saying that the disclosure of a plurality of steps, processes, operations or functions disclosed in the description or the claims should not be interpreted as being in the specified order, unless this is explicitly or implicitly stated otherwise, for example, for technical reasons. Therefore, these are not limited by the disclosure of a plurality of steps or functions to a specific sequence unless for technical reasons these steps or functions are not interchangeable. Also, in some examples a single step, function, process or operation can include a plurality of sub-steps, sub-functions, sub-processes or sub-operations and/or be broken down into the same. Such sub-steps can be included and form part of the disclosure of this single step, unless they are explicitly excluded.

In addition, the following claims are hereby incorporated into the detailed description, where each claim can stand for a separate example in itself. While each claim can stand as a separate example in itself, it is important to note that, although a dependent claim in the claims may relate to a specific combination with one or more other claims—other examples may also comprise a combination of the dependent claim with the subject matter of any other dependent or independent claim. Such combinations are explicitly proposed here, unless it is specified that a certain combination is not intended. In addition, features of a claim should also be included for any other independent claim, even if this claim is not directly made dependent on the independent claim.

What is claimed is:

1. A method for determining at least one calibration parameter for a radar system with a first radar transceiver and a second radar transceiver, the method comprising:
    performing a first calibration measurement comprising the following:
        generating a first frequency-modulated oscillation signal via the first radar transceiver based on frequency ramp parameters that characterize a frequency ramp;
        applying the first frequency-modulated oscillation signal to a first terminal of the first radar transceiver, the first terminal being connected to a second terminal of the second radar transceiver via a signal line;
        generating a second frequency-modulated oscillation signal via the second radar transceiver based on the frequency ramp parameters; and
        combining the first frequency-modulated oscillation signal received via the second terminal with the second frequency-modulated oscillation signal via the second radar transceiver to generate a first difference signal having a first frequency difference between the first frequency-modulated oscillation signal and the second frequency-modulated oscillation signal;
    performing a second calibration measurement which comprises the following:
    generating the second frequency-modulated oscillation signal via the second radar transceiver based on the frequency ramp parameters;
    applying the second frequency-modulated oscillation signal to the second terminal;
    generating the first frequency-modulated oscillation signal via the first radar transceiver based on the frequency ramp parameters; and
    combining the second frequency-modulated oscillation signal received via the first terminal with the first frequency-modulated oscillation signal via the first radar transceiver to generate a second difference signal having a second frequency difference between the first frequency-modulated oscillation signal and the second frequency-modulated oscillation signal; and
    determining the at least one calibration parameter,
        wherein the at least one calibration parameter includes a signal propagation time over the signal line, and
        wherein determining the signal propagation time comprises:
            deriving a first analytical signal from the first difference signal;
            deriving a second analytical signal from the second difference signal;
            multiplying the first analytical signal by the second analytical signal to obtain a first combined signal;
            determining a first frequency peak in the first combined signal; and
            determining the signal propagation time based on a frequency of the first frequency peak and a gradient of the frequency ramp.

2. The method as claimed in claim 1, further comprising:
for the first calibration measurement, activating the first radar transceiver via a first signal in order to trigger the generation of the first frequency-modulated oscillation signal and activating the second radar transceiver via a second signal in order to trigger the generation of the second frequency-modulated oscillation.

3. The method as claimed in claim 2, further comprising:
respectively outputting the first signal and the second signal to the first radar transceiver and the second radar transceiver simultaneously.

4. The method as claimed in claim 2, further comprising:
outputting the second signal to the second radar transceiver with a time delay relative outputting the first signal to the first radar transceiver.

5. The method as claimed in claim 4, further comprising:
synchronizing signal processing of the second radar transceiver to a first local clock signal, and wherein the second signal is output to the second radar transceiver delayed by one or more clock cycles of the first local clock signal relative to the output of the first signal to the first radar transceiver.

6. The method as claimed in claim 5, further comprising:
synchronizing signal processing of the first radar transceiver to a second local clock signal, wherein the first local clock signal and the second local clock signal are derived from one clock source.

7. The method as claimed in claim 1, wherein the signal propagation time is determined based on a ratio of a gradient of the frequency ramp to a difference between the first frequency difference and the second frequency difference.

8. The method as claimed in claim 1, wherein the at least one calibration parameter is a time delay between a first local clock signal, used by the first radar transceiver for synchronizing its signal processing, and a second local clock signal, used by the second radar transceiver for synchronizing its signal processing.

9. The method as claimed in claim 8, wherein determining the time delay comprises:
    determining the time delay based on a ratio of a gradient of the frequency ramp to a sum of the first frequency difference and the second frequency difference.

10. The method as claimed in claim 8, wherein determining the time delay comprises:
    deriving a first analytical signal from the first difference signal;
    deriving a second analytical signal from the second difference signal;
    multiplying the second analytical signal by a complex conjugate of the first analytical signal to obtain a second combined signal;
    determining a second frequency peak in the second combined signal; and
    determining the time delay based on both a frequency of the second frequency peak and a gradient of the frequency ramp.

11. The method as claimed in claim 1, further comprising:
transmitting the frequency ramp parameters to the first radar transceiver and the second radar transceiver prior to the first calibration measurement; and storing the frequency ramp parameters by via the first radar transceiver and the second radar transceiver prior to the first calibration measurement.

12. The method as claimed in claim 1, wherein the signal line is a line for transmitting an oscillation signal derived from a local oscillator from the first radar transceiver to the second radar transceiver during a radar measurement.

13. The method as claimed in claim 1, wherein the first radar transceiver is formed on a first semiconductor chip, and wherein the second radar transceiver is formed on a second semiconductor chip.

14. A radar system, comprising:
a first radar transceiver;
a second radar transceiver; and
a processing circuit configured to:
    activate the first radar transceiver to generate a first frequency-modulated oscillation signal for a first calibration measurement based on frequency ramp parameters that characterize a frequency ramp, and apply the first frequency-modulated oscillation signal to a first terminal of the first radar transceiver, wherein the first terminal is connected to a second terminal of the second radar transceiver via a signal line;
    activate the second radar transceiver to generate a second frequency-modulated oscillation signal for the first calibration measurement based on the frequency ramp parameters, and to combine the first frequency-modulated oscillation signal received via the second terminal with the second frequency-modulated oscillation signal in order to generate a first difference signal having a first frequency difference between the first frequency-modulated oscillation signal and the second frequency-modulated oscillation signal;
    activate the second radar transceiver to generate the second frequency-modulated oscillation signal for a second calibration measurement based on the frequency ramp parameters and to apply the second frequency-modulated oscillation signal to the second terminal;
    activate the first radar transceiver to generate the first frequency-modulated oscillation signal for the second calibration measurement based on the frequency ramp parameters, and to combine the second frequency-modulated oscillation signal received via the first terminal with the first frequency-modulated oscillation signal in order to generate a second difference signal having a second frequency difference between the first frequency-modulated oscillation signal and the second frequency-modulated oscillation signal; and
    determine at least one calibration parameter,
        wherein the at least one calibration parameter includes a signal propagation time over the signal line, and
        wherein determining the signal propagation time comprises:
            deriving a first analytical signal from the first difference signal;
            deriving a second analytical signal from the second difference signal;
            multiplying the first analytical signal by the second analytical signal to obtain a first combined signal;
            determining a first frequency peak in the first combined signal; and
            determining the signal propagation time based on a frequency of the first frequency peak and a gradient of the frequency ramp.

15. The radar system as claimed in claim 14, wherein for the first calibration measurement the processing circuit is configured to activate the first radar transceiver via a first signal in order to trigger the generation of the first frequency-modulated oscillation signal and to activate the second radar transceiver via a second signal in order to trigger the generation of the second frequency-modulated oscillation signal.

16. The radar system as claimed in claim 15, wherein the processing circuit is configured to:
output the first signal and the second signal to the first radar transceiver and the second radar transceiver simultaneously; or
output the second signal to the second radar transceiver with a time delay relative to the first signal.

17. The radar system as claimed in claim 14, wherein the signal line is a line for transmitting an oscillation signal derived from a local oscillator from the first radar transceiver to the second radar transceiver during a radar measurement.

18. The radar system as claimed in claim 14, wherein the first radar transceiver is formed on a first semiconductor chip, and the second radar transceiver is formed on a second semiconductor chip.

19. The radar system as claimed in claim 14, wherein the at least one calibration parameter includes a time delay between a first local clock signal, used by the first radar transceiver for synchronizing its signal processing, and a second local clock signal, used by the second radar transceiver for synchronizing its signal processing.

20. A method for determining at least one calibration parameter for a radar system with a first radar transceiver and a second radar transceiver, the method comprising:
transmitting frequency ramp parameters, that characterize a frequency ramp, to the first radar transceiver and the second radar transceiver prior to performing a first calibration measurement;
storing the frequency ramp parameters via the first radar transceiver and the second radar transceiver prior to performing the first calibration measurement; and
performing the first calibration measurement comprising the following:
    generating a first frequency-modulated oscillation signal via the first radar transceiver based on the frequency ramp parameters;
    applying the first frequency-modulated oscillation signal to a first terminal of the first radar transceiver, the first terminal being connected to a second terminal of the second radar transceiver via a signal line;
    generating a second frequency-modulated oscillation signal via the second radar transceiver based on the frequency ramp parameters; and
    combining the first frequency-modulated oscillation signal received via the second terminal with the frequency-modulated second oscillation signal via the second radar transceiver to generate a first difference signal having a first frequency difference between the first frequency-modulated oscillation signal and the frequency-modulated second oscillation signal;
performing a second calibration measurement which comprises the following:

generating the second frequency-modulated oscillation signal via the second radar transceiver based on the frequency ramp parameters;

applying the second frequency-modulated oscillation signal to the second terminal;

generating the first frequency-modulated oscillation signal via the first radar transceiver based on the frequency ramp parameters; and combining the second frequency-modulated oscillation signal received via the first terminal with the first frequency-modulated oscillation signal via the first radar transceiver to generate a second difference signal having a second frequency difference between the first frequency-modulated oscillation signal and the second frequency-modulated oscillation signal; and determining the at least one calibration parameter based on the first difference signal and the second difference signal.

\* \* \* \* \*